(No Model.) 2 Sheets—Sheet 1.

E. G. SHORTT.
ENGINEER'S VALVE FOR AIR BRAKES.

No. 538,542. Patented Apr. 30, 1895.

Witnesses:
Robt F. Gaylord
Raphaël Netter

Inventor
Edward G. Shortt
by Duncan & Page
Attorneys (No Model.) 2 Sheets—Sheet 2.
E. G. SHORTT.
ENGINEER'S VALVE FOR AIR BRAKES.
No. 538,542. Patented Apr. 30, 1895.
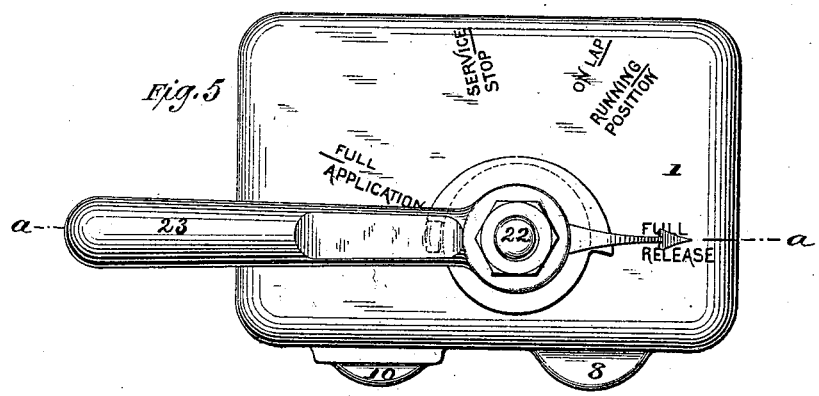
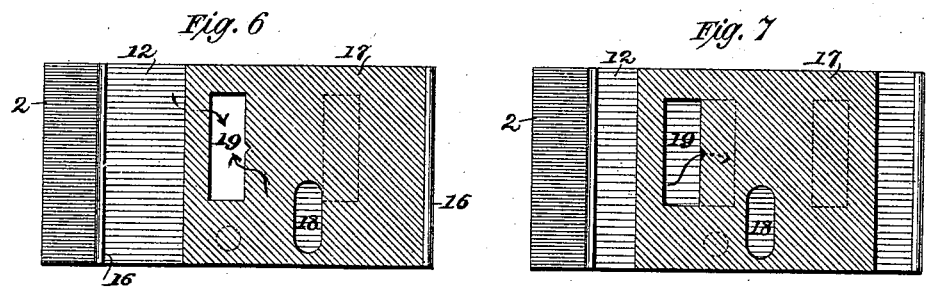
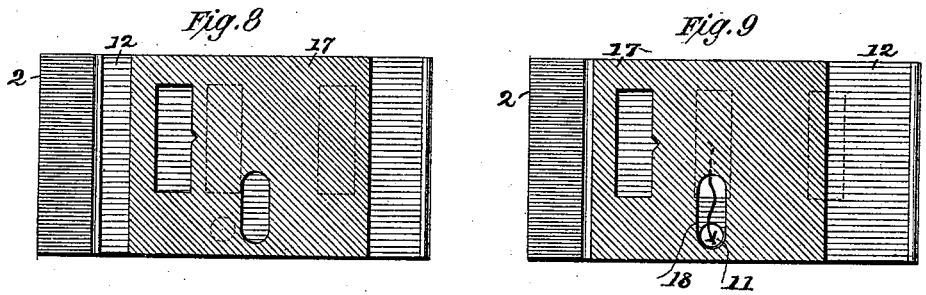
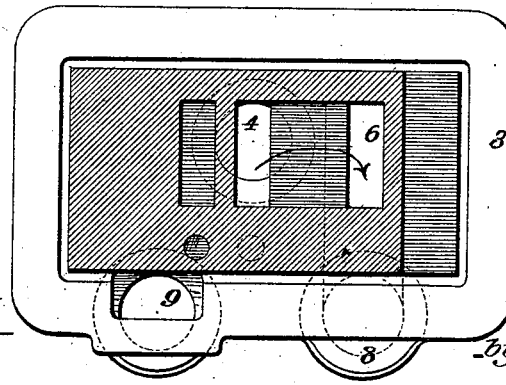
Witnesses:
Robt. F. Gaylord
Raphael Netter
Inventor
Edward G. Shortt
by Duncan & Page
Attorneys

UNITED STATES PATENT OFFICE.

EDWARD G. SHORTT, OF CARTHAGE, ASSIGNOR TO CHARLES GOODWIN EMERY, TRUSTEE, OF NEW YORK, N. Y.

ENGINEER'S VALVE FOR AIR-BRAKES.

SPECIFICATION forming part of Letters Patent No. 538,542, dated April 30, 1895.

Application filed May 31, 1892. Serial No. 434,925. (No model.)

*To all whom it may concern:*

Be it known that I, EDWARD G. SHORTT, a citizen of the United States, residing at Carthage, in the county of Jefferson, in the State of New York, have invented certain new and useful Improvements in Engineers' Valves for Air-Brakes, of which the following is a specification, reference being had to the drawings accompanying and forming a part of the same.

The improvements relate to that type of an engineer's valve mechanism having a graduation valve and an emergency valve, one movable relatively to the other to effect one kind of brake application, and both movable together to effect another kind of application.

Various forms of this type of valve mechanism have heretofore been produced, but the valves thereof had circular movement relatively to each other, and hence were subject to irregular wear as to their contact surfaces, which resulted in undesirable leakage, calling for frequent reshaping or renewal of the valves, as well as for special means acting to forcibly hold the valves to seat and which therefore interfered with the easy manipulation of the valves.

The invention consists of an engineer's airbrake valve mechanism, provided with two flat, plate-like valves, each having rectilinear movement on its seat, one movable to effect a graduation or service application of the brakes, and the other movable to effect an emergency application of the brakes.

Figure 1:
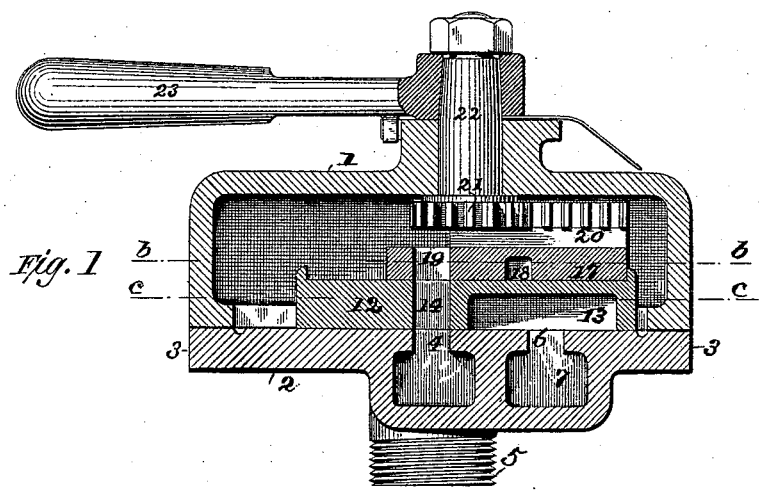
Figure 2:
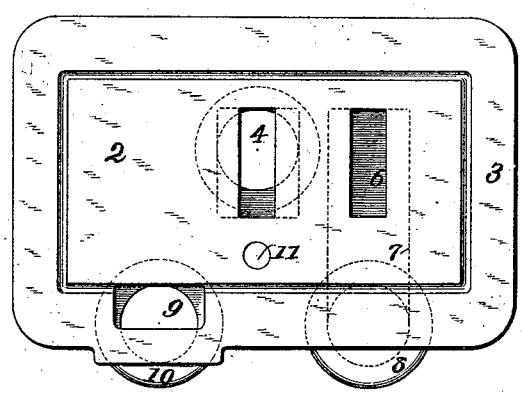
Figure 3:
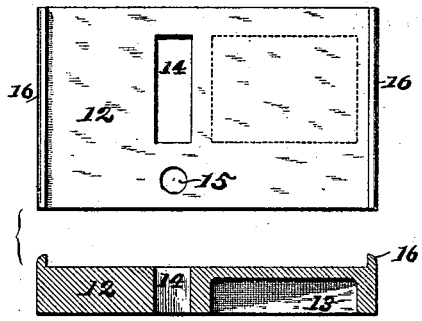
Figure 4:
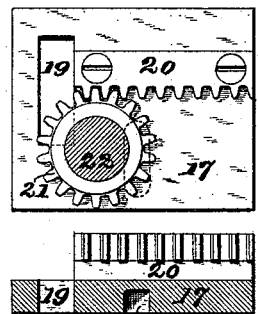

Figure 1 is a vertical section of a mechanism embodying my invention on plane *a a* of Fig. 5, the valves being shown in release position. Fig. 2 is a plan view of the base part of the valve-casing, the upper or dome part of the casing being removed. Fig. 3 is a plan view of the emergency-valve and also a central vertical section of the same. Fig. 4 is a like view and section of the graduation or service application valve. Fig. 5 is a plan view of the casing and manually operative handle of the valve mechanism. Fig. 6 is a plan view of the graduation and emergency valves in operative position, the side walls of the casing being cut away, but the valve seat being shown, the graduation-valve being sectioned on plane *b b*, Fig. 1, and the valves being shown in release position. Fig. 7 is a similar view, the valves being in running position. Fig. 8 shows the same in on-lap position. Fig. 9 shows the same in service or graduation position. Fig. 10 is a plan view of the base part of the casing similar to Fig. 2, but with the emergency-valve (sectioned on plane *c c* of Fig. 1) lying on the same in emergency position and the graduation-valve being removed.

In the views 1 is the dome or top of the valve casing, and 2 is the base or valve seat part of the same, these parts being secured together in any proper way as by the flange 3 on the base part.

4 is the train pipe port, and 5, the train pipe or train pipe connection.

6 is the emergency exhaust port, which communicates with passage 7 leading to the exhaust pipe 8 open to the atmosphere.

9 is the main reservoir port which openly communicates with the reservoir connection 10 as well as with the interior space of the dome casing.

11 (Figs. 2 and 9) is the graduation or service exhaust port in the base of the casing and which opens to the atmosphere.

12 (Fig. 3, and Figs. 6 to 9) is the emergency valve, of width corresponding to that of the valve seat of the base of the casing but shorter than the length of the same—Fig. 10. 13 is the emergency passage in this valve, the extent of which is such as suffices, upon suitable movement of this valve, to put the train pipe port 4 and the emergency exhaust port 6 into open communication—Figs. 6 and 10. 14 (Figs. 1 and 3) is the release passage, which passes vertically through this valve, and is so positioned that in the release or running position of the valve it communicates with the train pipe port 4—Fig. 1. 15 (Figs. 3) is the graduation passage through this valve, which passage in the running position of the valve communicates with the graduation exhaust port 11. Each end of this valve is provided with a vertical flange or rib 16 acting to engage the graduation valve as explained below.

17 is the graduation or service application valve, which is of plate form and is seated on the emergency valve, being of the same width but of shorter length (Figs. 6 to 9) than the emergency valve. 18 is the graduation passage in this valve, which passage is located so that, upon the valve being removed to graduation position on the emergency valve (Fig. 9) or against the left-hand end flange of the latter, it will open the train pipe through the emergency valve to the graduation exhaust port. 19 (Figs. 4, 6 and 7) is the release passage piercing this valve and located so that when the valve is in the release position (Fig. 1) it communicates with the train pipe port through the release passage in the emergency valve, in which position this valve bears against the right-hand emergency valve flange 16 and so engages the latter valve.

20 is a rack fixed to the upper face of the graduation valve and meshing with the toothed wheel 21 on the axial shaft 22 of the engineer's handle 23, said shaft being properly journaled in the dome walls of the casing as shown.

When the parts are assembled and the casing closed, the valves are confined and held in the desired relative and operative position. The proper seating of the valves, is however, effected by the pressure of the main reservoir air which, when the brake system is in working condition, is constantly maintained on the valves and holds them tightly to seat, the graduation valve on the emergency valve, and the latter on its casing seat.

As is well understood in this art, only a slight feed communication between the main reservoir and the train pipe is normally necessary, and hence the running position of the valves will be that illustrated in Fig. 7, where the arrow indicates the usual small feed passage between the release passage 14 of the emergency valve and the release passage 19 of the graduation valve.

When it is desired to effect a graduation or service application of the brakes, the engineer will turn his handle to "service stop" position and thereby adjust the valves as seen in Fig. 9 where they cut off the flow of reservoir air and permit the slow or graduation exhaust of the train pipe air and a corresponding gradual or partial application of the brakes, while moving the handle back to "on lap" position blanks all ports and holds the brakes applied, after which a further or added graduation application action can be effected.

To effect an emergency or full application of the brakes, the engineer will turn his handle to "full application" position, whereupon the valves will be moved to cut off the reservoir flow and to fully open the train pipe to emergency exhaust, the emergency valve being engaged by the graduation valve and forced to the extreme left-hand position on its seat—Fig. 10.

To effect the release of the brakes, the handle will be turned to "release" position, whereupon the reservoir will be put to full open communication with the train pipe, and after the brakes have released, the handle may be turned to running or on lap position.

In moving the graduation valve to graduation position, it comes to engagement with the left-hand emergency valve flange, and the engineer is made aware by sense of touch of its position, and is warned against further movement, as when full application is not desired. In moving the valves from emergency or full application position to release position, the graduation valve is first brought to noticeable engagement with the emergency valve and the release passages in the valves are put to communication, and the engineer is advised that further movement will begin to effect release action, which action therefore is controllable if it be desired to so have it.

What is claimed as new is—

1. In combination in an engineer's valve mechanism, rectilinearly-moving valves one controlling a graduation train-pipe exhaust port and one controlling an emergency train-pipe exhaust port, and valve-actuating mechanism operative to move one of said valves to effect a graduation application and to move the other said valve to effect an emergency application.

2. In combination in an engineer's valve mechanism, rectilinearly-moving valves one controlling a graduation train-pipe exhaust port and one controlling an emergency train-pipe exhaust port, one of the valves being seated on and having motion relatively to the other valve, and valve-actuating mechanism operative to move one of said valves to effect a graduation application and to move the other said valve to effect an emergency application.

3. In combination in an engineer's air-brake valve mechanism, a slide-valve controlling an emergency exhaust port from the train-pipe, a slide-valve seated on the other said valve and controlling through the same a graduation exhaust port from the train-pipe, said valves having rectilinear movement on their seats, and valve-actuating mechanism connected to said valves and operative to open said graduation valve independently of opening said emergency valve for the purpose of effecting a graduation application, and operative to open said emergency valve independently of effecting a graduation action, substantially as set forth.

4. In combination in an engineer's valve mechanism, a slide-valve controlling a train-pipe graduation exhaust port, a slide-valve controlling a train-pipe emergency exhaust port, each of said valves being held to seat by main reservoir pressure, and valve-actuating mechanism for independently operating said valves for the purpose of effecting a graduation application and for the purpose of effecting an emergency application, substantially as set forth.

EDWARD G. SHORTT.

Witnesses:
J. E. NORMAND,
H. B. EDMONDS.